No. 648,620. Patented May 1, 1900.
H. C. HOLMES.
PORTABLE ADJUSTABLE VESSEL LOADING DEVICE.
(Application filed Jan. 16, 1900.)
(No Model.)
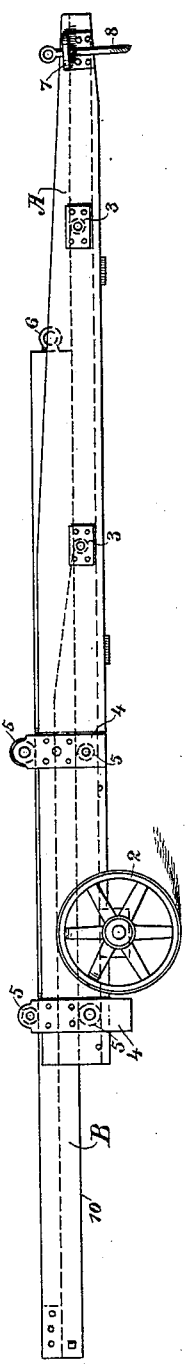
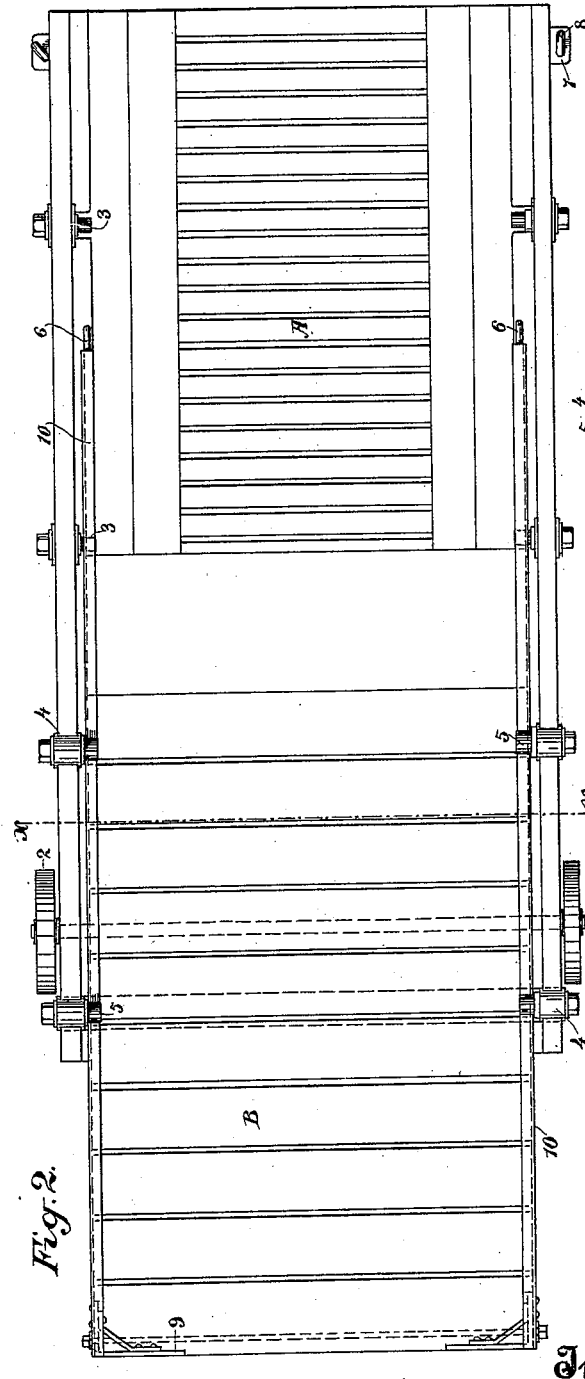
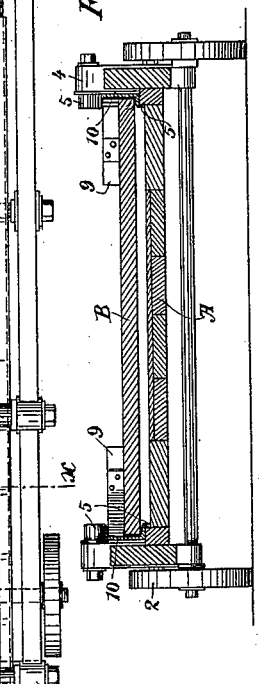
Witnesses,
Inventor
Howard C. Holmes
By Dewey Strong & Co.
Attys

UNITED STATES PATENT OFFICE.

HOWARD C. HOLMES, OF SAN FRANCISCO, CALIFORNIA, ASSIGNOR TO RICHARD D. CHANDLER, OF SAME PLACE.

PORTABLE ADJUSTABLE VESSEL-LOADING DEVICE.

SPECIFICATION forming part of Letters Patent No. 648,620, dated May 1, 1900.

Application filed January 16, 1900. Serial No. 1,605. (No model.)

*To all whom it may concern:*

Be it known that I, HOWARD C. HOLMES, a citizen of the United States, residing in the city and county of San Francisco, State of California, have invented an Improvement in Portable Adjustable Vessel-Loading Devices; and I hereby declare the following to be a full, clear, and exact description of the same.

My invention relates to a device which is designed for the loading of vessels from wharves, and is particularly adapted for the purpose of discharging from wagons or carts directly upon the vessel's deck or into the hold.

It consists of slidable and longitudinally-extensible driveway-sections, one of which is mounted upon wheels near one end and is provided with suitable means near the other end for locking it down to the wharf when in position, the other section being extensible beyond the first section, so as to be projected to any desired distance beyond the wharf-stringer. These two sections form a driveway upon which a cart or wagon may be moved, so that it stands over the deck or hatchway of a vessel into which its contents are to be discharged, and by the extension the projection of the driveway beyond the wharf can be regulated to suit the varying conditions involved by the position of the vessel with relation to the wharf, the "tumbling home" of the sides, or the location of the hatches.

Referring to the accompanying drawings, Figure 1 is a side elevation. Fig. 2 is a plan view of the apparatus extended. Fig. 3 is a transverse section taken through *x x* of Fig 2.

The object of my invention is to provide a portable and easily-adjustable driveway for use in loading vessels and the like from wharves.

The driveway is made in two sections A and B, which may be made of wood, iron, or steel in any suitable manner. As here shown, the section A is composed of side timbers having an axle extending across near one end and wheels 2 upon said axle, by which said end is supported, these wheels serving when the apparatus is to be moved to make it easily portable by attaching a team to the opposite end. The section B is here shown as made of channel-iron 10 and is slidable with relation to section A. The frame of the outer section B is here shown as being slightly narrower than the interior width of the section A. Upon the inner sides of section A are mounted wheels or rollers 3, in such position that the lower edge of the outer section will rest and travel freely upon these rollers when it is retracted or advanced. Near the outer ends of the section A are yokes or frames 4, having journaled in them rollers 5, one roller in each yoke being below and the other above the rails of the section B, as shown in Fig. 1, and they are separated at a sufficient distance so as to form a sufficiently-rigid support, while allowing the section B to freely move outward or inward with relation to A.

When the apparatus is to be contracted for transportation purposes, it is only necessary to attach a rope or chain to the inner ends of section B, which is easily effected by means of eyes 6, and by the use of a team or other convenient power the outer section can be drawn inwardly and telescoped over the inner section, thus contracting the length of the device to about one-half of its greatest extension. In this condition it is ready for transportation from point to point, and it may be thus transported either by hitching a team directly to the end opposite to that which is supported by the wheels 2 or by resting this end upon the rear end of a wagon or other vehicle to which a team is attached.

When the device is to be used, it is backed up against the wharf-stringer at the point where the vessel or scow may be lying, and the wheels 2 may abut against the stringer, or, if desired, they may stand at some distance away from the stringer, the wheels being high enough, so that the rear end of the section will be enough higher than the top of the stringer so that the extension B can be easily projected beyond the stringer.

In order to secure the section A and prevent its being tilted up by the outboard weight of the team when the extension B has been projected into position for use, I fix locking devices to the inner ends of the sections A, so that it can be firmly bolted or secured to the wharf. Various devices for this purpose may be used. In the present case I have shown angle-iron strips 7 bolted to the side of the rails of A, so that one flange projects outwardly therefrom, and holes being made through this projecting flange an eye-bolt 8, the lower end of which is screw-threaded and pointed, is inserted, and this can be turned by a capstan-bar or other device and screwed into the wharf, thus holding the end of the part A firmly in place.

Both sections A and B are suitably planked and may have transverse cleats, if desired, so that the horse's feet will not slip in backing the wagon upon them. The planking of the outboard portion B is beveled at its inner end, so as to meet smoothly with the planking of the section A, and a team can thus be easily backed up onto the section B to a point where it is to be dumped.

In order to prevent the wheels of the cart or wagon passing beyond the end of the section, I have shown stops 9, which may be made either by bending the outer ends of the channel-iron sides at right angles, so that they extend toward each other to a distance inside of the line of the wagon-wheels, or it may be done by bolting angle-iron strips into the ends of the side rails of the section B, so that these angle-irons project into the line of the wheels and form stops against which they will strike when the cart or wagon has been backed as far as it is desirable to go. The extension B can by this construction be moved outward after the part A has been placed and anchored and made to project to any desired extent beyond the wharf-rail, resting thereon or being otherwise supported therefrom, so as to prevent too great a strain upon the inner ends and connections with the inner section.

Having thus described my invention, what I claim as new, and desire to secure by Letters Patent, is—

1. A device for loading vessels from wharves consisting of a portable structure comprising sections one slidable and extensible longitudinally with relation to the other, and means whereby said other section is secured in position.

2. A loading and unloading device comprising a wheeled main frame and means for fixing it in position, and a second frame slidably mounted in the main frame and extensible longitudinally beyond the end thereof.

3. A device for loading vessels and the like from wharves consisting of a driveway for wagons or carts, said driveway comprising two sections, one of which is slidable and extensible with relation to the other, and said other section having one end mounted upon wheels, and means for locking the opposite end to the wharf.

4. A device for loading vessels consisting of a gang or drive way, said driveway being composed of two sections, one of which has one end mounted upon wheels, the other end provided with means for locking it down upon the wharf, guides fixed to said section, within which guides the outermost section is slidable and extensible with relation to the first section.

5. An extensible driveway consisting of two sections one of which is slidable with relation to the other whereby it may be extended for use, or drawn in upon the other section for transportation, said other section having wheels upon which one end is supported, and means for connecting the opposite end with a team or motor whereby it may be moved from place to place.

6. An extensible driveway for loading purposes consisting of a section having one end mounted upon wheels, means for locking the other end to the wharf-level so as to form an incline, a second section guided and slidable with relation to the first section whereby it may be extended outwardly, said outer section having inturned angle-iron strips fixed to the ends of the side rails and forming stops for vehicle-wheels.

7. A device for loading vessels consisting of an inclined driveway-section having one end mounted upon wheels, devices fixed to the opposite end whereby it may be secured to the wharf, bearing-rollers journaled within the side rails of said section, a second section, the rails of which are movable upon said bearing-rollers whereby said section may be extended or contracted with relation to the first-named section.

In witness whereof I have hereunto set my hand.

HOWARD C. HOLMES.

Witnesses:
S. H. NOURSE,
JESSIE C. BRODIE.